United States Patent

Wiman et al.

[11] Patent Number: 5,810,518
[45] Date of Patent: Sep. 22, 1998

[54] FASTENING ARRANGEMENT FOR CUTTING INSERTS AND A CUTTING INSERT INTENDED FOR SUCH AN ARRANGEMENT

[75] Inventors: Jörgen Wiman; Lennart Byström, both of Sandviken, Sweden

[73] Assignee: Sandvik AB, Sandviken, Sweden

[21] Appl. No.: 719,976

[22] Filed: Sep. 24, 1996

[30] Foreign Application Priority Data

Sep. 25, 1995 [SE] Sweden .................................. 9503307

[51] Int. Cl.⁶ ........................................................ B23B 27/06
[52] U.S. Cl. ............................... 407/102; 407/47; 408/197
[58] Field of Search ............................... 407/47, 48, 103, 407/101, 113; 408/197, 713, 233

[56] References Cited

U.S. PATENT DOCUMENTS

| | | | |
|---|---|---|---|
| 1,621,226 | 3/1927 | Welter | 407/47 |
| 1,629,667 | 5/1927 | Knipple | 407/102 |
| 1,681,675 | 8/1928 | Miller | 408/197 |
| 2,140,941 | 12/1938 | Reaney . | |
| 2,453,464 | 11/1948 | Sheridan . | |
| 3,829,943 | 8/1974 | Bartoszevicz | 29/97 |
| 4,437,802 | 3/1984 | Hall, Jr. . | |
| 4,573,832 | 3/1986 | Zinner | 407/70 |
| 4,632,609 | 12/1986 | Johne | 408/197 |
| 5,028,175 | 7/1991 | Pawlik | 407/40 |
| 5,236,288 | 8/1993 | Flueckiger | 407/36 |
| 5,469,902 | 11/1995 | Sharp et al. | 40/47 |

FOREIGN PATENT DOCUMENTS

| | | | |
|---|---|---|---|
| 183293 | 10/1952 | Germany | 408/197 |
| 3533125 A1 | 3/1987 | Germany . | |
| WO 95/29026 | 11/1995 | WIPO . | |

*Primary Examiner*—Daniel W. Howell
*Assistant Examiner*—Mark Williams
*Attorney, Agent, or Firm*—Burns, Doane, Swecker & Mathis, L.L.P.

[57] ABSTRACT

A metal cutting insert is directly mounted on a support surface formed either by an insert holder, or by a shim interposed between the insert and insert holder. The insert includes a bottom surface having grooves and planar surface portions disposed between the grooves. The support surface includes ribs which fit into respective grooves of the insert. Some of the planar surface portions of the insert bear against a planar, rib-free portion of the support surface.

10 Claims, 5 Drawing Sheets

FASTENING ARRANGEMENT FOR CUTTING INSERTS AND A CUTTING INSERT INTENDED FOR SUCH AN ARRANGEMENT

BACKGROUND OF THE INVENTION

The present invention relates to an arrangement for the fastening of cutting inserts on cutting insert holders for the cutting machining of primarily metals, and to cutting inserts intended to be fastened in such an arrangement.

Different cutting inserts and indexable cutting inserts are fastened in tool holders in several different, known ways. The most usually occurring is that the cutting insert has a central through-hole and the insert seat in the holder has a threaded hole. A locking screw is introduced into the central hole of the insert and is tightened in the hole of the holder by a suitable torque, and frequently also a shim plate with a central hole is placed between the cutting insert and a bottom support surface. Usually, the insert seat also comprises two mutually substantially perpendicular abutment surfaces, or three abutment points, for bearing against two of the edge surfaces of the cutting insert.

The disadvantage of that construction is that a certain play of the insert may easily arise after a period of use. A further disadvantage is that one may easily happen to tighten the screw too strongly, whereby it may be damaged or even broken.

Other known insert holders have a clamp or similar fastening arrangement which presses upon the upper side of the insert in order to clamp it in the insert seat. The pressing force of the clamp may be regulated by a screw. Such constructions may for instance be used for clamping cutting inserts without any central hole, as is the case for parting inserts for example.

In order to avoid a play and to attain a more stable fastening of a cutting insert in general constructions have been suggested according to which the bottom side of the cutting insert and the bottom support surface of the insert seat have been shaped as serrated surfaces intended to mesh into each other. Such a construction is disclosed in U.S. Pat. Nos. 2,140,941 and 2,453,464. However, one drawback with these embodiments is that they require a very extensive grinding of the serrated surface of either the insert or the holder, or both. A further drawback is that, even if the cutting insert has been secured in a direction perpendicular to the serrations, a vertical play may arise just as easily as in the case of two wholly planar bearing abutment surfaces, in particular during machining operations prone to vibrations.

In U.S. Pat. No. 4,437,802 there is disclosed how a cutting insert is fastened in a drill, the cutting insert comprising two grooves and the support surface of the drill having two corresponding ribs which shall fit exactly into the grooves and occupy their whole cross-sectional area. Again, the problem is that axial play may easily arise, particularly if the drill is subjected to vibrations. Moreover, an extensive grinding is required of either the ribs or the grooves, in order to attain the required fitting precision.

Further, in German Patent 35 33 125 a milling tool is disclosed, according to which the cutting inserts bear against the holder on serrated surfaces in order to strengthen and stabilize the fastening capability. The disadvantage of this construction, as well as with the embodiments according to the above-mentioned patent publications, is that it is not possible to turn the inserts less than half a revolution when indexing a new cutting edge. Moreover, an extensive precision work is required for the production of the serrated surface of the holder.

Thus, a primary object of the present invention is to provide an arrangement for the fastening of cutting inserts, which arrangement makes possible a very strong and very stable fastening of the insert, without the slightest risk of moving the insert.

Another object of the present invention is to provide an arrangement that enables a stable and strong fastening of the insert in at least two, preferably three indexed positions.

Still another object of the present invention is to provide a strong, play-free and stable fastening of the insert without any costly and time-consuming grinding.

Yet another object of the present invention is to provide a cutting insert which may be directly press-formed and that allows for a very strong and stable fastening in two or more insert positions.

A still further object of the present invention is to avoid the necessity of abutment surfaces or abutment points in the insert seat, which require a high dimension accuracy.

These and further objects have been achieved by the present invention which relates to the combination of a cutting insert and a support element, as well as to the cutting insert per se.

The cutting insert includes a bottom surface having grooves formed therein, and substantially planar surface portions disposed between the grooves. The support element includes a support surface upon which the bottom surface of the insert is directly supported. The support element could comprise an insert holder or a shim disposed between the insert and the insert holder. A portion of the support surface includes ribs, and another portion of the support surface is ribbed free. The ribs fit into respective ones of the grooves. At least some of the substantially planar support portion bear against the rib free portion of the support surface.

The invention also relates to a round cutting insert for metal cutting machining. The insert comprises round, top and bottom surfaces and a side surface extending between the top and bottom surfaces. At least the bottom surface has grooves extending generally radially from a center of the insert. The invention further relates to a cutting insert for metal cutting machining comprising top and bottom surfaces and side surfaces extending therebetween. The bottom surface includes at least two groups of grooves. The grooves of each group are arranged substantially parallel to one another.

BRIEF DESCRIPTION OF THE DRAWING

The objects and advantages of the invention will become apparent from the following detailed description of preferred embodiments thereof in connection with the accompanying drawing in which like numerals designate like elements, and in which.

DETAILED DESCRIPTION OF PREFERRED EMBODIMENTS OF THE INVENTION

Figure 1:
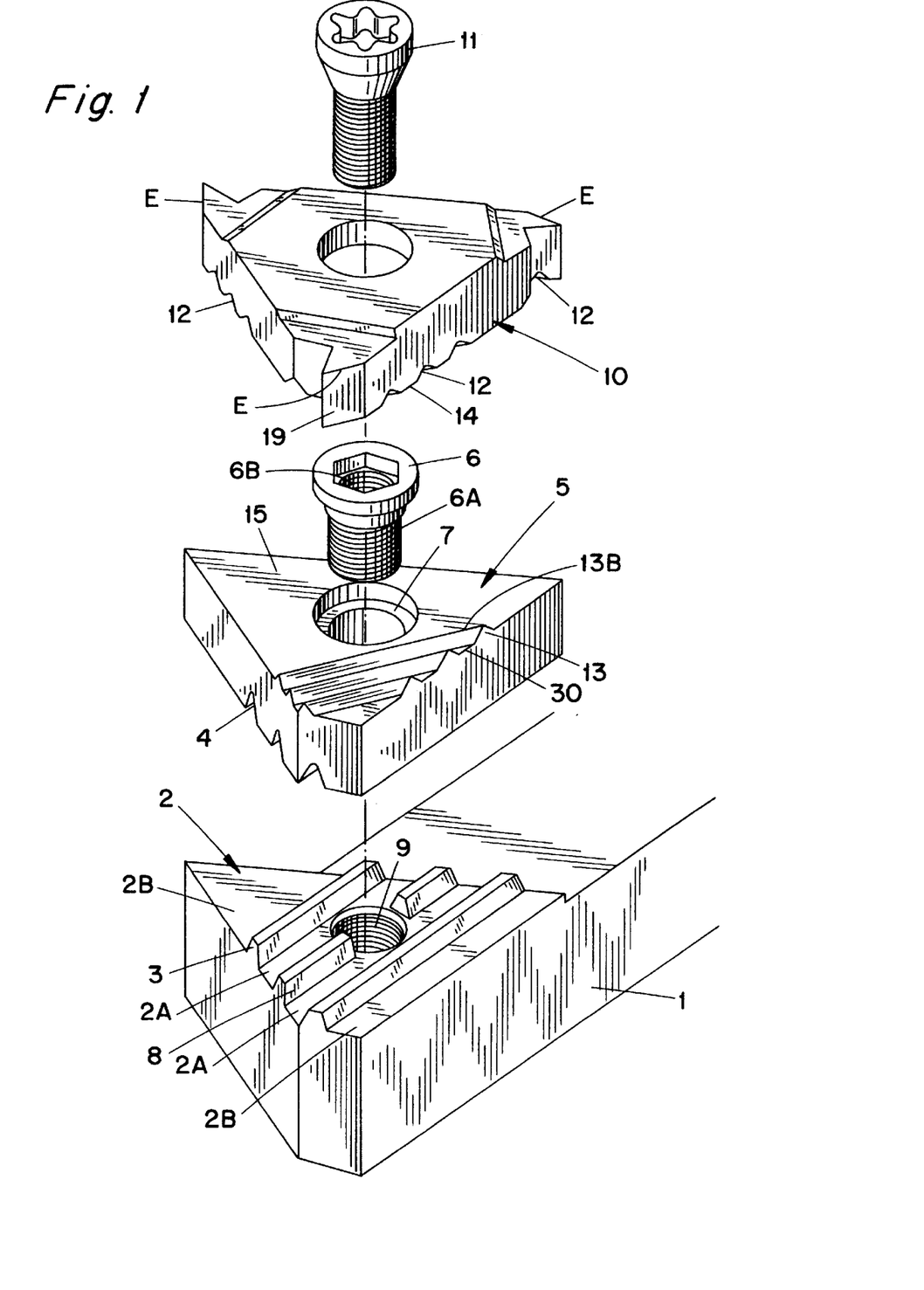
FIG. 1 shows an insert fastening arrangement according to the invention, in the form of an exploded view in perspective, obliquely from above.

FIG. 1 shows a boring bar or insert holder 1 whose shaft part is not essential for the present invention. The front part of the holder comprises a base surface 2, on which are arranged ribs 3 which are intended to fit into grooves 4 formed on the bottom side of a support element in the form of a shim 5. The ribs 3 and the grooves 4 may suitably be made in accordance with Swedish Patent Application No. 9401429-7 (corresponds to WO 95/29026), which makes it possible to dispense with rear abutment surfaces or points in the insert seat. Thus, as may be see in FIG. 1, this insert seat does not require any abutment surfaces, which considerably simplifies the manufacturing of the insert seat. The shim 5 is fastened on the base surface 2 by a shim screw 6 that has an outer thread 6A threaded into the hole 9, whereby the bottom side of the head of the shim screw presses against the abutment surface 7. Thereby, the flange surfaces of the grooves are pressed against the corresponding flange surfaces 8 of the ribs 3, whereby a small gap is created between the bottom side of the shim on the one hand, and the surfaces 2A disposed between the ribs 3, and surfaces 2B disposed outside the ribs 3, on the other hand.

However, it should be pointed out that the boundary layer or interface comprising the ribs 3 and the grooves 4 is not the boundary layer relating to this invention. In FIG. 1, the boundary layer that relates to the invention is the one between the shim 5 and a cutting insert 10, which boundary layer will now be further described.

Figure 2:
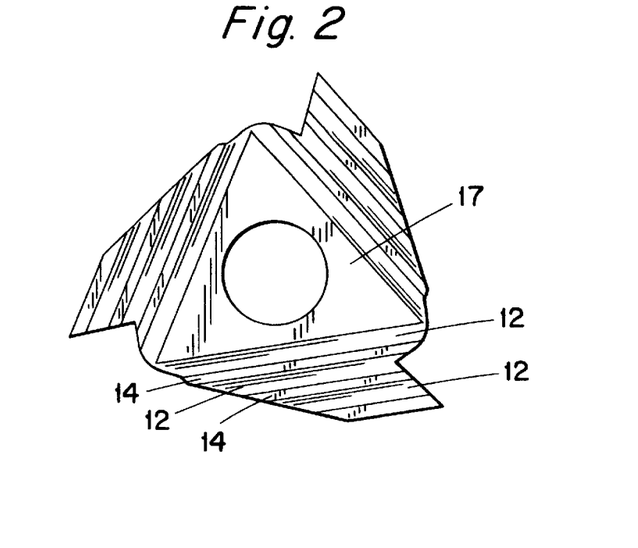
FIG. 2 shows a bottom plan view of the cutting insert of FIG. 1.

On top of the shim 5 there is fastened a cutting insert 10, in this case a triangular, single-sided insert secured by means of a locking screw 11, which is tightened into an inner thread 6B of the shim screw 6. Usually, the insert 10 is made of coated or uncoated cemented carbide, although other materials may also occur, e.g., different ceramic materials. A top side of the cutting insert has cutting edges E. The bottom side of the cutting insert 10 has groups of ribs 16 and grooves 12 in all three corners, which may be seen more clearly in FIG. 2. One set of such substantially parallel grooves is brought into engagement with a group of corresponding upwardly projecting ribs 13 disposed on the top side 15 of the shim which constitutes an upwardly facing support surface. Between the grooves 12 and outside the outermost groove, downwardly projecting ribs are formed having substantially planar surfaces or cams 14, which cams 14 are intended to bear against a non-ribbed portion of the top side of the shim in a way that is shown more clearly at the left side in FIGS. 6 and 7.

Figure 6:
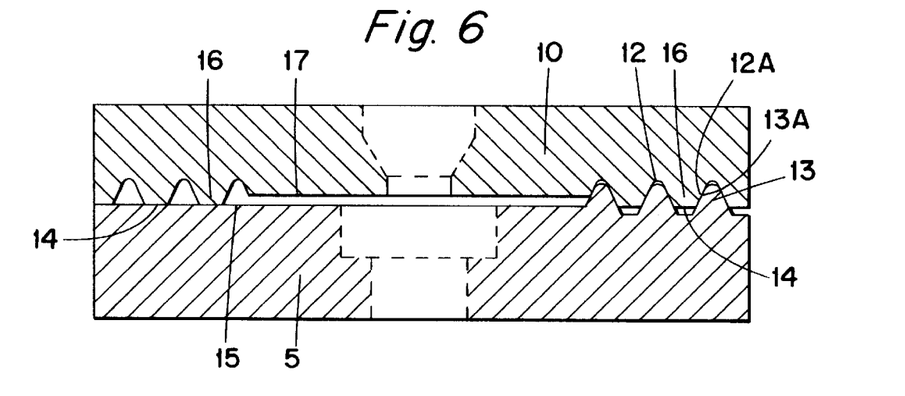
FIG. 6 shows a cross section of a first basic embodiment of the invention.
Figure 7:
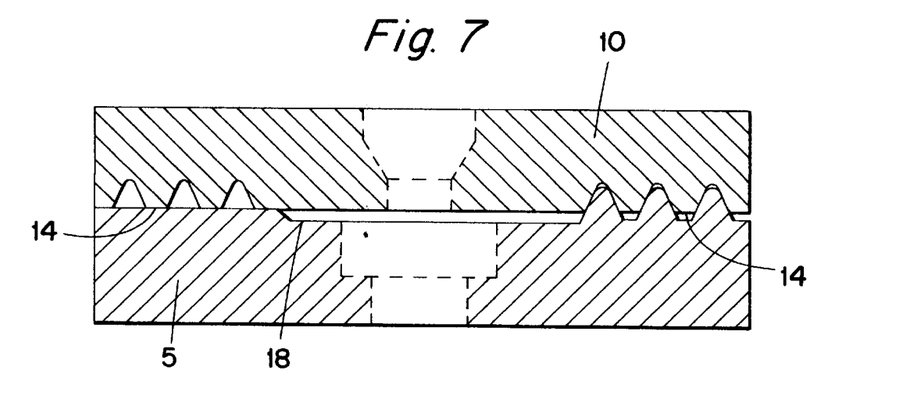
FIG. 7 shows a cross section of a second basic embodiment of the invention.

FIGS. 6 and 7 show the principle of the present invention, viz., that the ribs 16 with their planar cams 14 fulfil a double function. On one hand the ribs 16, which have a truncated triangle cross-sectional shape, serve for wedging and fastening within grooves 30 formed between the ribs 13 of the shim (or of the insert holder, if no shim is used), and on the other hand the planar cams 14 of the ribs 16 function as bearing surfaces which bear against planar non-ribbed portions of the top surface 15 of the shim (or of the insert holder, which constitutes a support element if no shim is used). As may be further seen in FIG. 6 (and also FIG. 7), the upwardly converging flange (side) surfaces 13A of the ribs 13 bear against the flange downwardly diverging (side) surfaces 12A of the grooves 12. Contrary thereto, the tops 13B of the ribs 13 are not intended to reach the tops of the grooves 12. Also, the bottoms 14 of the ribs 16 do not reach the bottoms of the shim grooves 30.

In order not to cause a statical over-determination, the cutting insert 10 according to FIG. 6 is provided with a central, more deeply recessed middle portion 17, which is not in contact with the shim.

Another embodiment principle is shown in FIG. 7. According to this, the bottom surface of the insert is planar and in the same level as the planar rib cams 14. Instead, the shim 5 has been provided with a deeper middle portion 18, in order to obtain the statically well-defined abutment of three points or regions at the three corners of the insert.

Figure 3:
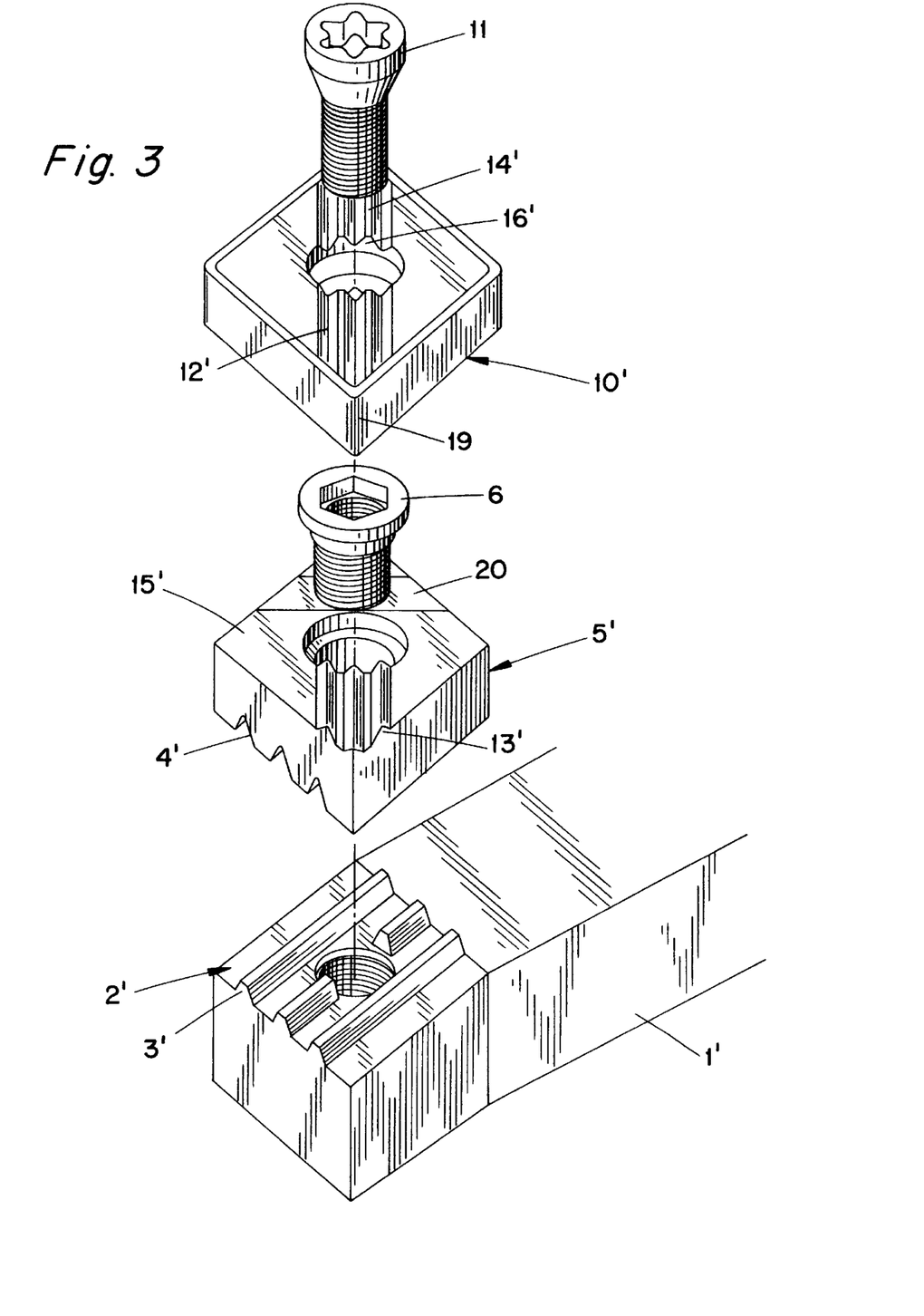
FIG. 3 shows an exploded view of another embodiment of the invention, in perspective obliquely from above.

FIG. 3 shows another embodiment according to the present invention. Also this embodiment has a boring bar 1' with a front base 2' and ribs 3' which cooperate with grooves 4' on the bottom side of the shim 5'. In the same way as in FIG. 1, an indexable cutting insert 10' is fastened on the shim 5'. The indexable insert 10' is double-sided and is on both sides provided with grooves 12' and 16', the latter having planar cams 14'. As may be glimpsed into the insert through-hole according to FIG. 3, also the opposite side of the insert is provided with similar serrated portions as the visible top surface. In the same way as in FIG. 1, the ribs 16' engage between ribs 13' on the top side 15' of the shim, in order to strengthen and stabilize the operative cutting corner 19. In order to give a well defined, distinct bearing portion, a portion 20 on the top side of the shim may be somewhat raised, in order to bear against the planar rib cams 14' of the insert. Thus, also in this case the ribs 16' of the insert fulfill the double function that is characteristic of the invention.

According to FIGS. 1 and 3, the ribs 13 and 13', respectively, are located underneath the operative cutting corner and that is also the preferred embodiment. However, they may also be arranged at one of the non-operative corners.

Figure 4:
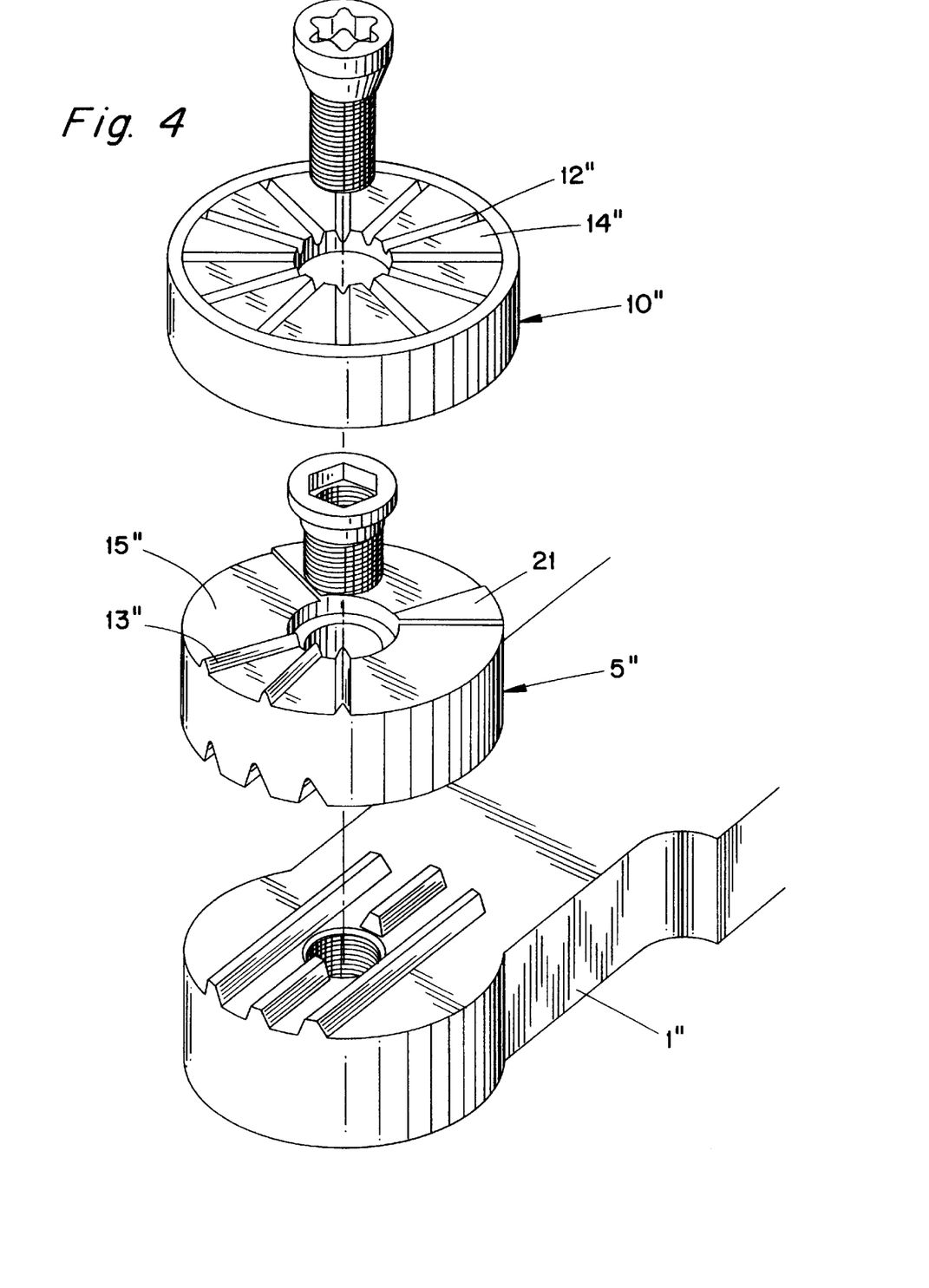
FIG. 4 shows an exploded view of still another embodiment of the invention, in perspective obliquely from above.

The invention may also be applied to round cutting inserts. As illustrated in FIG. 4, the shim 5" bears against the boring 1" in the same way as in FIGS. 1 and 3. Also in this case, the cutting insert 10" is double-sided, wherefor the bottom side of the insert is basically identical with the visible top side. A number of radial grooves 12" are arranged on the two opposed main sides of the insert. For instance between two and five, suitably three (as shown in FIG. 4) of those grooves enclose an equally large number of ribs 13" on the top side 15" of the shim 5", whereby abutment is accomplished in the above described way on the flank surfaces of the grooves and the ribs, as shown in FIGS. 6 and 7. Any other abutment between the insert and the shim may per se take place over the whole surface 15", but preferably this surface is provided with two protruding bearing surfaces 21, which are intended to bear against corresponding sector-shaped, planar surface portions 14" on the round insert. Thereby, also according to his embodiment a statically well-defined three-point or three-region abutment is obtained.

Figure 5:
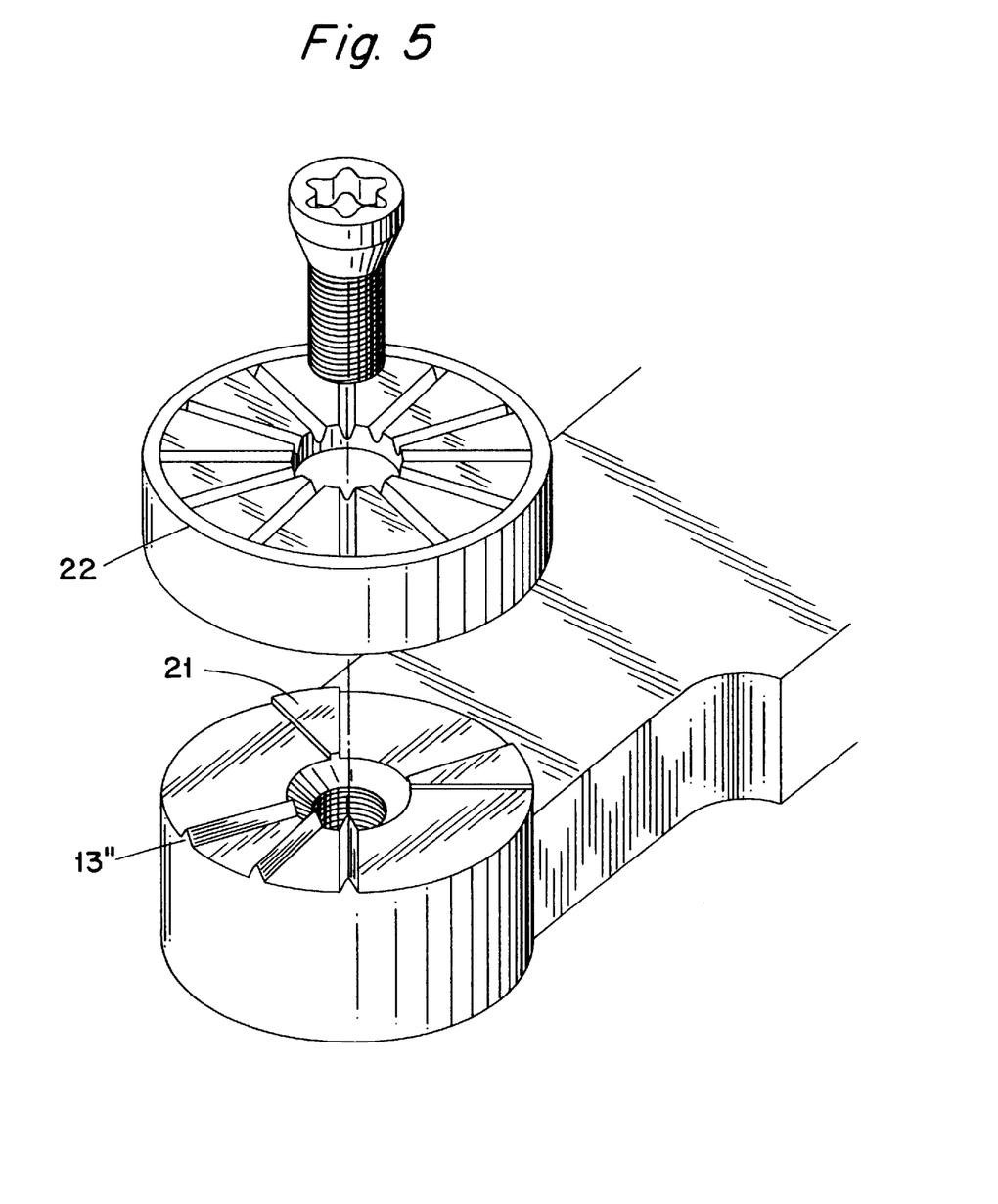
FIG. 5 shows an exploded view of still another embodiment of the invention, in perspective obliquely from above.

FIG. 5 shows an embodiment that is analogous to the one in FIG. 4. The difference is that it lacks a shim. Thus, the ribs 13" and the protrusions 21 are arranged directly on the boring bar.

As should be evident for the skilled artisan, a new section of the cutting edge 22 may be indexed by untightening the locking screw and turning the round insert according to FIGS. 4 and 5 at least by a twelfth of a revolution since the grooves 12" divide the main surfaces of the insert into twelve sectors. Thereafter, the locking screw is tightened again.

By the principle described above a number of advantages has been achieved. A considerably stronger and stable fastening of different cutting inserts has been obtained in comparison with cutting inserts whose bottom surfaces are planar. Moreover, this has been accomplished in a way that puts considerably smaller demands on the manufacturing accuracy than would be the case if the whole bottom side of the insert were made with grooves and ribs, which would be intended to cooperate with corresponding grooves and ribs on the top side of the shim. Another evident advantage is that the improved strength and stability of the fastening is obtained without having to dispense with the possibilities of indexing new cutting edges of the insert. As is clear from the above description, the invention is applicable on any insert shape, such as triangular, rhombic, square, rectangular, round, hexagonal and octagonal inserts, and inserts for grooving operations.

Eventually, it may be pointed out that the fastening arrangement according to the invention is also suitable for milling and drilling.

Although the invention has been described in connection with preferred embodiments thereof, it will be appreciated by those skilled in the art that additions, modifications, and substitutions may be made without departing from the spirit and scope of the invention as defined in the appended claims.

What is claimed is:

1. In combination, a cutting insert and a support element;

the support element including an upwardly facing support surface; the support surface including a planar portion and a ribbed portion spaced from the planar portion, the ribbed portion including a plurality of upwardly projecting first ribs; each first rib including a pair of first side surfaces converging upwardly toward a top of the respective first rib; adjacent ones of the first ribs spaced apart by upwardly open first grooves disposed in the support surface, each first groove including sides diverging upwardly from a bottom of a respective first groove and defined by the first side surface of the adjacent first ribs;

the cutting insert including an upwardly facing top surface having a cutting edge, and a downwardly facing bottom surface seated on the support surface, the bottom surface including a plurality of spaced apart rib/groove groups;

each rib/groove group including a plurality of downwardly open second grooves, each second groove including a pair of second side surface diverging downwardly from a top of a respective second groove, adjacent ones of the second grooves spaced apart by downwardly projecting second ribs disposed on the bottom surface;

each second rib including sides converging downwardly toward a bottom of a respective second rib and defined by the second side surfaces of the respective adjacent second grooves, the second ribs being of truncated triangular shape in cross section, whereby the bottoms thereof comprise downwardly facing planar surfaces;

the bottom surface of the cutting insert arranged on the support surface such that the planar surfaces of the second ribs of at least a first rib/groove group of the cutting insert bear against the planar portion of the support surface, and a second rib/groove group of the cutting insert engage the ribbed portion of the support surface such that:

the first ribs of the second group are received in respective ones of the second grooves, and the second ribs are received in respective ones of the first grooves;

the second side surfaces are supported on the first side surfaces;

the tops of the first ribs are spaced below the tops of the respective second grooves, and the bottoms of the second ribs spaced above the bottoms of respective first grooves, whereby contact between the second rib/groove group and the support surface occurs only where the first side surfaces of the first ribs engage the second side surfaces of the second grooves to produce a wedging effect therebetween;

an area of bottom surface disposed between the first and second rib/groove groups being spaced above the support surface.

2. The combination according to claim 1, further including a fastener for applying a downward force on the cutting insert to push the bottom surface against the support surface.

3. The combination according to claim 2 wherein the holding surface includes a threaded hole formed therein; the cutting insert including a through-hole extending therethrough and through the area of the bottom surface disposed between the first and second rib/groove groups; the fastener including a screw extending through the through-hole and threaded into the threaded hole.

4. The combination according to claim 1 wherein the holding surface includes a threaded hole formed therein; the cutting insert including a through-hole extending therethrough; the combination further including a fastener screw extending through the through-hole and threaded into the threaded hole.

5. The combination according to claim 1 wherein the support element is a shim.

6. The combination according to claim 1 wherein the support element is an insert holder.

7. A cutting insert for metal cutting machining comprising a body having top and bottom surfaces, the top surface including a cutting edge, the bottom surface including at least two spaced-apart groups of downwardly projecting ribs each having two sides converging downwardly toward a downwardly facing planar face of the rib, whereby each rib has a truncated triangle-shaped cross sectional shape, adjacent ones of the ribs separated by a groove having upwardly diverging sides defined by the side surfaces of the ribs.

8. The cutting insert according to claim 7 wherein there are two groups of ribs.

9. The cutting insert according to claim 7 wherein there are three groups of ribs.

10. A round cutting insert for metal cutting machining comprising a body having top and bottom surfaces, the top surface having a round cutting edge, the bottom surface including downwardly projecting, radially extending ribs, each rib having two sides converging downwardly toward a downwardly facing planar face of the rib, whereby each rib has a truncated triangle cross-sectional shape, adjacent ones of the ribs separated by a groove having upwardly diverging sides defined by the side surfaces of the ribs.

* * * * *

UNITED STATES PATENT AND TRADEMARK OFFICE
CERTIFICATE OF CORRECTION

PATENT NO.    :    5,810,518

DATED    :    September 22, 1998

INVENTOR(S)    :    Jörgen WIMAN et al.

It is certified that error appears in the above-identified patent and that said Letters Patent is hereby corrected as shown below:

In the Claims: Column 6, line 47, change "upwardly diverging" to -- downwardly diverging --

Signed and Sealed this

Third Day of April, 2001

*Attest:*

NICHOLAS P. GODICI

*Attesting Officer*      Acting Director of the United States Patent and Trademark Office

UNITED STATES PATENT AND TRADEMARK OFFICE
CERTIFICATE OF CORRECTION

PATENT NO. : 5,810,518            Page 1 of 1
DATED : September 22, 1998
INVENTOR(S) : Jörgen Wiman; Lennart Byström It is certified that error appears in the above-identified patent and that said Letters Patent is hereby corrected as shown below:

Claim 7, and Claim 10,
penultimate line, change "upwardly" to -- downwardly --

Signed and Sealed this

Twenty-eighth Day of August, 2001

*Attest:*

*Nicholas P. Godici*

NICHOLAS P. GODICI
*Attesting Officer*      *Acting Director of the United States Patent and Trademark Office*